United States Patent
Saito et al.

(10) Patent No.: US 11,005,101 B2
(45) Date of Patent: May 11, 2021

(54) BLOCK GRAFT COPOLYMER BINDERS AND THEIR USE IN SILICON-CONTAINING ANODES OF LITHIUM-ION BATTERIES

(71) Applicant: UT-Battelle, LLC, Oak Ridge, TN (US)

(72) Inventors: Tomonori Saito, Knoxville, TN (US); Pengfei Cao, Knoxville, TN (US); Jagjit Nanda, Knoxville, TN (US); Michael Naguib Abdelmalak, Metairie, LA (US)

(73) Assignee: UT-Battelle, LLC, Oak Ridge, TN (US)

( * ) Notice: Subject to any disclaimer, the term of this patent is extended or adjusted under 35 U.S.C. 154(b) by 348 days.

(21) Appl. No.: 15/958,181

(22) Filed: Apr. 20, 2018

(65) Prior Publication Data

US 2019/0229337 A1  Jul. 25, 2019

Related U.S. Application Data

(60) Provisional application No. 62/619,364, filed on Jan. 19, 2018.

(51) Int. Cl.
*H01M 4/62* (2006.01)
*H01M 10/0525* (2010.01)
(Continued)

(52) U.S. Cl.
CPC ........... *H01M 4/622* (2013.01); *C08B 37/003* (2013.01); *C08F 251/00* (2013.01);
(Continued)

(58) Field of Classification Search
CPC .............................. H01M 4/622; C08B 37/003
See application file for complete search history.

(56) References Cited

U.S. PATENT DOCUMENTS

| | | | |
|---|---|---|---|
| 9,359,508 B2* | 6/2016 | Kobayashi | C08K 3/38 |
| 10,400,115 B2* | 9/2019 | Iijima | H01G 11/38 |
| 2019/0319269 A1* | 10/2019 | Saito | H01M 4/485 |

FOREIGN PATENT DOCUMENTS

CN    107011609 A    *   8/2017

OTHER PUBLICATIONS

Cao P. et al., "Effect of Binder Architecture on the Performance of Silicon/Graphite Composite Anodes for Lithium Ion Batteries", Applied Materials & Interfaces (2018), vol. 10, pp. 3470-3478 DOI: 10.1021/acsami.7b13205.
(Continued)

*Primary Examiner* — Tracy M Dove
(74) *Attorney, Agent, or Firm* — Scully, Scott, Murphy & Presser, P.C.

(57) ABSTRACT

A graft copolymer composition comprising the following structure:

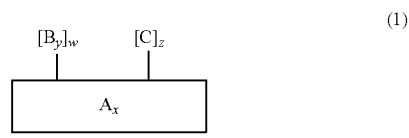

(1)

wherein: $A_x$ represents a polymer backbone having a number of polymerized monomer units x; $[B_y]$ represents a multiplicity of a graft polymer side chain having a number of polymerized monomer units y, and at least a portion of the monomer units in $B_y$ contains a group —C(O)OM, with M independently selected from H and alkali metals; [C] represents a multiplicity of positions on the polymer backbone $A_x$ where the graft polymer side chain B or any other graft polymer side chain is not attached; the subscript w represents (Continued)

sents a grafting density of the group $B_y$, wherein w is an integer within a range of 10-50%; and the subscript z represents a density of the group C, wherein z=(100−w) %. The invention is also directed to lithium-ion batteries in which the above-described composition is incorporated in an anode of the battery.

20 Claims, 5 Drawing Sheets

(51) Int. Cl.
| | |
|---|---|
| *C08L 33/02* | (2006.01) |
| *C08L 5/08* | (2006.01) |
| *C08F 251/00* | (2006.01) |
| *C08B 37/08* | (2006.01) |
| *C08F 293/00* | (2006.01) |
| *H01M 4/02* | (2006.01) |

(52) U.S. Cl.
CPC ............ *C08F 293/005* (2013.01); *C08L 5/08* (2013.01); *C08L 33/02* (2013.01); *H01M 10/0525* (2013.01); *C08F 2438/03* (2013.01); *C08L 2203/20* (2013.01); *H01M 2004/027* (2013.01)

(56) References Cited

OTHER PUBLICATIONS

Lee J. et al., "Amphiphilic Graft Copolymers as a Versatile Binder for Various Electrodes of High-Performance Lithium Ion Batteries", Small Journal (2016), pp. 1-9 DOI: 10.1002/smll.201600800.

Wei L. et al., "Poly (acrylic acid sodium) grafted carboxymethyl cellulose as a high performance polymer binder for silicon anode in lithium ion batteries", Scientific Reports (2016), pp. 1-8 DOI: 10.1038/srep19583.

\* cited by examiner 2A  2B 2C  2D

BLOCK GRAFT COPOLYMER BINDERS AND THEIR USE IN SILICON-CONTAINING ANODES OF LITHIUM-ION BATTERIES

CROSS REFERENCE TO RELATED APPLICATION

The present application claims benefit of U.S. Provisional Application No. 62/619,364, filed on Jan. 19, 2018, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention generally relates to anode compositions for lithium-ion batteries, and more particularly, to lithium-ion batteries having a silicon-containing anode.

BACKGROUND OF THE INVENTION

Increasing the energy density of the lithium-ion battery (LIB) is necessary to meet the demands for their expanding applications from portable electronics to large-scale emerging applications, such as renewable energy storage grids and electric vehicles that require acceptable driving distance upon a single charging. Among many candidates that can increase the energy density of the anode, silicon (Si) is highly promising due to its high theoretical capacity (3579 mAh/g for Si compared to 372 mAh/g for commercial graphite anode), low operating potential, non-toxicity and worldwide abundance (e.g., Du et al., *J. Mater. Chem. A*, 4, 32, 2016).

However, the high specific capacity of the silicon-based electrode is typically observed only at the initial cycles, and cannot meet the long cycle life required for typical electric vehicle application. At a fundamental level, the origin of fast capacity fade is mainly due to two main factors: (i) very large volume fluctuation (about 280%) during the lithiation and delithiation 30318 (3106.0) 1 process that causes the fracturing, pulverization and electrical isolation of silicon particles from the electrode matrix; and (ii) continuous formation and reformation of the solid electrolyte interfaces (SEI) during charge-discharge which consumes extra lithium and results in lower coulombic efficiency (e.g., Nishikawa et al., *J. Power Sources*, 302, 46, 2016). Fabrication of the silicon-based electrode with nano/micro-hierarchical structures, such as nanotubes, nanopillars, porous particle, and core-shell nanofibers have been explored and have achieved some success in reducing the dimensional stress during volume change. However, the complex and costly production process make these approaches challenging to deploy in practical applications. Moreover, there remains a need for significantly improved cycling performance, particularly in capacity retention and coulombic efficiency over extended numbers (e.g., hundreds or thousands) of cycles.

SUMMARY OF THE INVENTION

In one aspect, the invention is directed to a graft copolymer composition useful as a novel binder for a silicon-based anodic material in a lithium-ion battery. Incorporation of this binder into the anode of a lithium-ion battery advantageously results in an exceptional cycling performance and retention, particularly in capacity retention and coulombic efficiency over extended numbers of cycles. The novel binder has the following general structure:

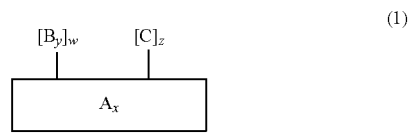

In Formula (1) above, $A_x$ represents a polymer backbone having a number of monomer units x, wherein x is at least 20; $[B_y]$ represents a multiplicity of a graft polymer side chain having a number of polymerized monomer units y, wherein y is an integer of at least 10, and at least a portion of the monomer units in $B_y$ contains a group —C(O)OM, wherein M is independently selected in each occurrence from H and alkali metals; [C] represents a multiplicity of positions on the polymer backbone $A_x$ having a functional group capable of attaching to a graft polymer side chain B but at which position the graft polymer side chain B or any other graft polymer side chain is not attached; the subscript w represents a grafting density of the group $B_y$, wherein w is an integer within a range of 10-50%; and the subscript z represents a density of the group C, wherein z=(100−w) %.

In another aspect, the invention is directed to lithium-ion batteries in which the above binder is incorporated. The binder is particularly considered for incorporation into an anode of the lithium-ion battery. In particular embodiments, the lithium-ion battery includes at least: (i) an anode containing the above-described binder and silicon nanoparticles, (ii) a cathode suitable for a lithium-ion battery, and (iii) a lithium-containing electrolyte medium in contact with the anode and cathode. The invention is also directed to the operation of a lithium-ion battery in which any of the above anodic compositions is incorporated.

By virtue of the improved properties of the anodic compositions described herein, the resulting lithium-ion battery containing the anodic composition described above provides several advantages over conventional lithium-ion batteries of the art, including high reversible capacities, high retention of capacity after hundreds or thousands of cycles, and high coulombic efficiencies and retention thereof. Compared with polyvinylidene fluoride (PVDF), glycol chitosan (GC), or a physical mixture of GC and lithium polyacrylate (LiPAA), the novel graft block copolymers described herein provide significantly improved binder performance. As further discussed below, with the same chemical composition and functional group ratio, a representative graft block copolymer (e.g., GC-g-LiPAA) reveals improved cycling performance in both capacity retention (495 mAh/g vs. 356 mAh/g at 100th cycle) and coulombic efficiency (90.3% vs 88.1% at 1st cycle) than the physical mixing of GC and LiPAA. Galvanostatic results also demonstrate the significant impacts of different architecture parameters of graft copolymers on their ultimate binder performance. For example, by simply changing the side chain length of GC-g-LiPAA, the retaining de-lithiation capacity after 100 cycles varies from 347 mAh/g to 495 mAh/g. This invention also demonstrated that the GC-g-LiPAA with longer side-chain length and higher grafting density is preferred as the polymer binder for silicon/graphite composite electrode, which gave higher performance of silicon/graphite electrode than the current-state of the art.

In particular embodiments, the graft copolymer GC-g-LiPAA with GC as backbone and lithium polyacrylate (LiPAA) as side chains was obtained by RAFT polymerization of acrylic acid (AA) followed by the neutralization of LiOH. The side chain length is also tunable by changing the feed ratio during the reaction, which was confirmed by $^1$H NMR and IR spectral analysis. By using an environmentally friendly and economically saving solvent, such as water, a high mass-loading silicon/graphite composite electrode (active materials>2.5 mg/cm$^2$) based on graft copolymer (GC-g-LiPAA) was fabricated and tested by galvanostatic measurement. Compared with the linear analogues, such as GC and physical mixing of GC and LiPAA, silicon/graphite composite electrodes made with the graft copolymer GC-g-LiPAA exhibits significantly improved initial discharge capacity, long-term retaining capacity, and coulombic efficiency. With the same chemical composition and functional group ratio, the improved cycling performance of graft block copolymer GC-g-LiPAA in both retaining capacity and coulombic efficiency demonstrated the importance of the polymer binder architecture. These results also demonstrated that the GC-g-LiPAA with longer side-chain length and higher grafting density is preferred as the polymer binder for silicon/graphite composite electrode due to the enhanced interaction with the anode composite, which was supported by the higher peeling strength and increased solution viscosity.

BRIEF DESCRIPTION OF THE DRAWINGS

FIG. 1A is a plot of solution viscosity of different polymer binders at the same polymer concentration (1 mg/mL), shear rate (10 s$^{-1}$), and temperature (20° C.): (I) GC$_{22\%}$-g-LiPAA$_{16}$, (II) GC$_{22\%}$-g-LiPAA$_{27}$, (III) GC$_{22\%}$-g-LiPAA$_{62}$, (IV) GC$_{12\%}$-g-LiPAA$_{76}$, (V) GC$_{21\%}$-m-LiPAA$_{76}$, and (VI) GC. FIG. 1B shows cyclovoltammetric (CV) curves of a Si/graphite electrode with GC$_{22\%}$-g-LiPAA$_{62}$ as polymer binder; inset is the zoom-in image to show the small peak in the first cathodic scan. FIG. 1C shows a peel test result of anode films with different polymer binders. FIG. 1D shows the related adhesion force of different polymer binders with silicon nanoparticles (SiNPs) measured by AFM; the curve with lower relative force value (more negative) corresponds to higher adhesion force.

FIG. 2A shows the cycling performance at a current rate of C/10, while FIG. 2B shows the cycling performance at a current rate of C/1. FIG. 2C shows the coulombic efficiency of the electrodes from different polymer binders; the inset is the zoom-in area showing the comparative efficiency of electrodes from GC$_{21\%}$-m-LiPAA$_{76}$ and GC$_{22\%}$-g-LiPAA$_{62}$ in the first 30 cycles. FIG. 2D shows the voltage profiles of the electrodes with GC$_{22\%}$-g-LiPAA$_{62}$ binders.

DETAILED DESCRIPTION OF THE INVENTION

Figure 1A:
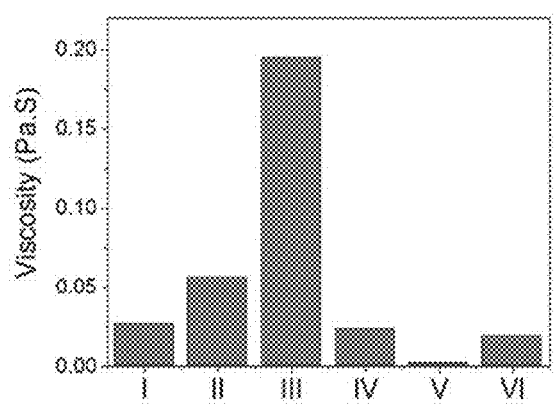
FIGS. 1A-1D.

In a first aspect, the invention is directed to a graft copolymer composition useful as a binder in an electrode, particularly in a silicon-containing anode of a lithium-ion battery. As well known, a graft copolymer contains a linear backbone (herein also referred to as A$_x$) and a multiplicity of polymeric branches (grafts) bound to and emanating from the linear backbone. The polymeric grafts generally extend radially or substantially perpendicular from the linear backbone. For this reason, graft copolymers may also be referred to as "brush" or "bottlebrush" polymers. A variety of synthetic methodologies are known for producing brush copolymers.

The graft copolymer composition of the present invention has the following general structure:

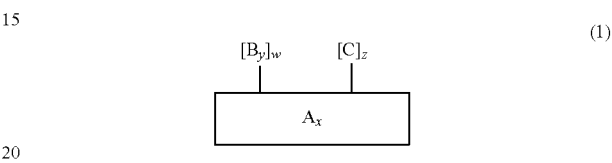

(1)

In Formula (1) above, A$_x$ represents a solid polymer backbone (A) having a number (x) of monomer units that have been polymerized, wherein x (degree of polymerization, i.e., DP, of A) is at least or greater than 20, 30, 40, 50, 60, 70, 80, 90, or 100. The polymer backbone (A) may have any suitable modulus, e.g., at least or above 1, 2, 5, 10, 20, or 50 MPa, or even a significantly higher modulus, such as 0.1, 0.5, 1, 2, or 2.5 GPa polymer. The polymer backbone (A) preferably includes one or more hydrophilizing functional groups, such as hydroxyl, amino, amido, alkyleneoxy (ether), carboxylic acid, carboxylate, and/or carboxylic acid ester groups.

In some embodiments, the polymer backbone (A) is a linear polysaccharide. In one embodiment, the polysaccharide is a homopolysaccharide by having all of the monosaccharide units as the same type (e.g., all glucose units). In another embodiment, the polysaccharide is a heteropolysaccharide by having different types of monosaccharide units. In some embodiments, the polysaccharide is functionalized with a multiplicity of hydroxyl, amino, or amido groups. The polysaccharide may be constructed of, for example, solely glucose units (i.e., a glucan polysaccharide). The glucan polysaccharide can be an α-glucan or β-glucan polysaccharide. A particular class of α-glucan polysaccharide considered herein is dextran. Some particular classes of β-glucan polysaccharides considered herein include cellulose, hemicellulose, cellodextrin, chrysolaminarin, lentinan, and zymosan. In some embodiments, at least a portion of the glucose units can be derivatized, such as found in chitin (i.e., a polymer of N-acetylglucosamine) or chitosan (a polymer of predominantly glucosamine). Other derivatized glycans include the glycosaminoglycans, such as chondroitin sulfate, dermatan sulfate, heparin, heparan sulfate, hyaluronic acid, and keratan sulfate.

In other embodiments, the polymer backbone (A) is a vinyl-addition type of polymer, which, as well known, is derived from the polymerization of one or more vinylic monomers. In some embodiments, the vinyl-addition polymer is a polyolefin (e.g., polyethylene or polypropylene, or copolymer thereof). Some examples of vinyl-addition polymers include homopolymers and copolymers of, for example, polyethylene, polypropylene, ethylene propylene rubber, a chlorinated polyolefin (e.g., polyvinylchloride, or PVC), a polydiene, such as polybutadiene (e.g., poly-1,3-butadiene or poly-1,2-butadiene), polyisoprene, dicyclopentadiene, ethylidene norbornene, vinyl norbornene, or a homogeneous or heterogeneous composite thereof, or a copolymer thereof (e.g., EPDM rubber, i.e., ethylene propylene diene monomer). In the case of polyethylene, the polyethylene can be any of the types of polyethylene known in the art, e.g., low density polyethylene (LDPE), linear low density polyethylene (LLDPE), very low density polyethylene (VLDPE), high density polyethylene (HDPE), medium density polyethylene (MDPE), high molecular weight polyethylene (HMWPE), and ultra high molecular weight polyethylene (UHMWPE). In the case of polypropylene, the polypropylene can also be any of the types of polypropylenes known in the art, e.g., isotactic, atactic, and syndiotactic polypropylene. The vinyl-addition polymer may also include polymerized segments or monomeric units of other vinylic monomers, such as styrene, acrylic acid, methacrylic acid, acrylonitrile, and halogenated polyolefins (e.g., fluorinated, chlorinated, or brominated polyolefins) as found, for example, in polystyrene, polyacrylic acid, polymethacrylic acid, polyacrylonitrile, polyvinylfluoride, polyvinylidene fluoride, polytetrafluoroethylene, and block, alternating, or random copolymers thereof.

The variable $[B_y]_w$ represents a multiplicity (represented by brackets, i.e., [ ]) of a graft polymer side chain B having a number of polymerized monomer units y (degree of polymerization of B), wherein y is an integer of least 10, preferably at least or above 10, 20, 30, 40, or 50 and up to 100, 150, 200, 250, 300, 400, or 500, e.g., within a range of 10-500. The variable w represents a grafting density of the group $B_y$, wherein w is an integer within a range of 10-50%. Generally, the grafting density is used to quantify the multiplicity (i.e., number) of $B_y$ polymer side chains. As known in the art, the grafting density refers to the number of sites on the polymer backbone that are occupied with polymer side chains relative to the total number of available sites on the polymer backbone before the polymer side chains were attached to the backbone. The grafting density is typically denoted as a percentage of polymer side chains relative to the total number of available sites on the polymer backbone. In different embodiments, w is precisely or about 10, 15, 20, 25, 30, 35, 40, 45, or 50%, or an integer within a range bounded by any two of the foregoing values. The variable B is a graft polymer side chain that contains at least one or a multiplicity of carboxylate groups represented by the formula —C(O)OM, wherein M is independently selected in each occurrence from hydrogen atom (H) and alkali metals (e.g., Li, Na, and K). B may include polymerized blocks or individual units of, for example, acrylic acid (CH$_2$=CH—C(O)OH), methacrylic acid (CH$_2$=C(CH$_3$)—C(O)OH), and alkali metal salts thereof. In some embodiments, a portion of the carboxylate groups may be esterified (i.e., where M is an alkyl or hydroxyalkyl or alkyleneoxy group); however, there should remain at least a portion of carboxylate groups in which M is H and/or alkali metal. In some embodiments, M is completely (i.e., 100%) H. In other embodiments, M is completely (i.e., 100%) an alkali metal. In yet other embodiments, some of M is H and some of M is alkali metal. For example, in different embodiments, precisely, about, at least, or more than 10%, 20%, 30%, 40%, 50%, 60%, 70%, 80%, 90%, or 95% of M is alkali metal, with remainder being H.

The variable $[C]_z$ represents a multiplicity (represented by brackets, i.e., [ ]) of positions (C) on the polymer backbone $A_x$ having a functional group capable of attaching to a graft polymer side chain B but at which position the graft polymer side chain B or any other graft polymer side chain is not attached. The functional group at C is typically a hydroxy, carboxylic acid, carboxylate, carboxylic acid ester, or amino group, or a precursor of such functional groups (e.g., nitrile may be hydrolyzed to carboxylic acid). As C represents vacant sites (i.e., not bound to a polymer side chain) on the backbone $A_x$, the density of such vacant sites (z) is related to the density of occupied sites (w) as z=(100−w) %.

The above-described graft copolymer composition can be produced by any suitable means by which polymer side chains can be grown from a main (backbone) polymer. In particular embodiments, the graft copolymer composition is prepared by reversible addition-fragmentation chain-transfer (RAFT) polymerization, which is well known in the art. RAFT is particularly advantageous for purposes of the present invention by virtue of its capacity to produce a range of copolymers differing in their grafting densities and polymer side chain lengths. In the RAFT polymerization process, a RAFT chain transfer agent (i.e., RAFT-CTA) is first attached or otherwise incorporated onto the polymer backbone ($A_x$). The presence of the CTA on the polymer backbone will later permit polymerization of co-monomeric carboxylate-containing species (e.g., acrylic or methacrylic acid) to produce the polymer side chains. The RAFT chain transfer agent may be, for example, 2-(butylthiocarbonothioylthio) propanoic acid. The chain transfer agent is typically a thiocarbonylthio compound (i.e., a compound containing a —C(=S)S— group). The thiocarbonylthio compound can be a dithioester, trithiocarbonate, or dithiocarbamate compound. Generally, the thiocarbonylthio agent includes a strong electronegative group (e.g., cyanide or carboxylic acid) adjacent to the thiocarbonylthio group in order for that portion of the transfer agent to function as a homolytic leaving group.

Each chain transfer agent generally produces distinct polymerization results for each type of monomer, with some chain transfer agents providing significantly inferior results than others per type of monomer and the type of polymer desired. Thus, the chain transfer agent generally needs to be carefully selected to ensure effective polymerization for a particular monomer or combination of monomers. Some examples of dithioester chain transfer agents include 4-cyano-4-(thiobenzoylthio)pentanoic acid (i.e., 4-cyanopentanoic acid dithiobenzoate, i.e., CPADB) and 2-cyanoprop-2-yl-dithiobenzoate. Some examples of trithiocarbonate chain transfer agents include 2-(butylthiocarbonothioylthio) propanoic acid (compound 2 in the scheme provided below in the Examples), 2-methyl-2-[(dodecylsulfanylthiocarbonyl)sulfanyl]propanoic acid, 4-cyano-4-(dodecylsulfanylthiocarbonyl) sulfanylpentanoic acid, S-cyanomethyl-S-dodecyltrithiocarbonate, S-(2-cyanoprop-2-yl)-S-dodecyltrithiocarbonate, and S,S-dibenzyltrithiocarbonate. An example of a dithiocarbamate chain transfer agent is 2-cyanomethyl-N-methyl-N-phenyldithiocarbamate.

In the RAFT polymerization process, the co-monomeric carboxylate-containing species that produces the polymer side chains is reacted with the CTA-containing polymer backbone in the presence of a radical initiator. The co-monomeric species can be a single species or two or more different monomeric species, e.g., acrylic acid, or methacrylic acid, or a mixture of acrylic acid and methacrylic acid, or a mixture of the any of the foregoing with acrylonitrile or an ester of acrylic acid or methacrylic acid. The initiator can be any of the initiators known in the art, but more typically an azo-containing initiator, such as azobisisobutyronitrile (i.e., AIBN) or 4,4'-azobis(4-cyanovaleric acid)(i.e., ACVA), equivalent to 4,4'-azobis(4-cyanopentanoic acid) (ACPA), or a combination thereof.

In other embodiments, the polymerization method is atom transfer radical polymerization (ATRP), which is a type of living polymerization well known in the art. In ATRP, a monomer composition is subjected to radical polymerization conditions in the presence of an ATRP catalyst (typically a transition metal catalyst, such as a Cu(I) compound) and ATRP initiator (typically an alkyl halide). A particular advantage of ATRP is its ability to provide a uniform polymer chain growth (i.e., with a low polydispersity index). Other forms of ATRP, such as reverse ATRP, AGET ATRP, and ICAR ATRP, are also applicable herein.

In another aspect, the invention is directed to a lithium-ion battery containing the above-described graft copolymer binder composition in the anode (negative electrode on discharge) of the battery. The lithium-ion battery generally contains the components typically found in a lithium-ion battery, including positive (cathodic on discharge) and negative (anodic on discharge) electrodes, current collecting plates, and a battery shell, such as described in, for example, U.S. Pat. Nos. 8,496,855, 8,252,438, 7,205,073, and 7,425,388, the contents of which are incorporated herein by reference in their entirety. The construction and assembly of lithium-ion batteries is well known in the art.

The negative (anode) electrode includes any of the carbon-containing and/or silicon-containing anode materials known in the art dispersed within the above-described graft copolymer binder composition. The carbon-containing composition is typically one in which lithium ions can intercalate or embed, such as graphite (e.g., natural or artificial graphite), petroleum coke, carbon fiber (e.g., mesocarbon fibers), carbon (e.g., mesocarbon) microbeads, fullerenes (e.g., carbon nanotubes, i.e., CNTs), and graphene. In particular embodiments, the anode includes a silicon-containing composition dispersed within the above-described graft copolymer binder composition. The silicon-containing composition, which may be used in the absence or presence of a carbon-containing composition in the anode, can be any of the silicon-containing compositions known in the art for use in lithium-ion batteries. Lithium-ion batteries containing a silicon-containing anode may alternatively be referred to as a lithium-silicon batteries. The silicon-containing composition may be, for example, in the form of a silicon-carbon (e.g., silicon-graphite, silicon-carbon black, silicon-CNT, or silicon-graphene) composite, silicon microparticles, or silicon nanoparticles, including silicon nanowires. The negative electrode composition is often further admixed with an adhesive (e.g., PVDF, PTFE, and co-polymers thereof) in order to gain the proper viscosity and density for molding as electrodes.

The positive (cathode) electrode is generally a lithium-containing material, such as, for example, lithium foil, a lithium metal oxide, or lithium-intercalated material, wherein the metal is typically a transition metal, such as Co, Fe, Ni, or Mn, or combination thereof. Some examples of cathode materials include $LiCoO_2$, $LiMn_2O_4$, $LiNiCoO_2$, $LiNiCoAlO_2$, $LiMnO_2$, and $LiFePO_4$, as well as spinel lithium manganese oxide compositions according to the formula $Li_xMn_{2-y-z}Ni_yM_zO_{4-n}X_n$, (e.g., $0.025 \le x \le 1.1$, $0.3 \le y \le 0.5$, $0 \le z \le 1.5$, $0 \le n \le 1$, M is a main group or transition metal, and X is a halide atom, such as F, Cl, Br, or I) in which a portion of the manganese is substituted with another metal. To improve conductivity at the positive electrode, a conductive carbon material (e.g., carbon black, carbon fiber, graphite, carbon nanotubes, buckminsterfullerenes, or carbon foam) is often admixed with the positive electrode material. The positive electrode composition is typically admixed with a binder or adhesive (e.g., PVdF, PTFE, and co-polymers thereof) in order to be properly molded as an electrode. As also known in the art, the positive and negative electrodes are typically affixed onto current collecting substrates, such as Cu or Al foil.

The lithium-ion battery may also include a solid porous membrane positioned between the negative and positive electrodes. The solid porous membrane can be composed of, for example, a plastic or polymeric material (e.g., polyethylene, polypropylene, or copolymer thereof) or an inorganic material, such as a transition metal oxide (e.g., titania, zirconia, yttria, hafnia, or niobia) or main group metal oxide, such as silicon oxide, which can be in the form of glass fiber.

As well known in the art, the lithium-ion battery typically also includes a lithium-containing electrolyte. The lithium-containing electrolyte typically includes at least one lithium electrolyte salt dissolved in a polar aprotic solvent (which may be composed of one or more polar aprotic solvents). The polar aprotic solvent can be, for example, ionic (e.g., an ionic liquid) or non-ionic. The one or more polar aprotic solvents are preferably non-reactive with the components of the lithium-ion battery, including the anode and the cathode, and furthermore, do not have a deleterious effect on the performance characteristics of the battery. The polar aprotic solvent, if present, can be any such solvent known to be useful in a lithium-ion battery. The polar aprotic solvent typically has a melting point of up to or less than 100, 90, 80, 70, 60, or 50° C., and more typically, below room temperature, i.e., below about 25° C., and more typically, up to or less than 20, 15, 10, 5, or 0° C. The non-ionic solvent can be, for example, a carbonate, sulfone, siloxane, silane, ether, ester, nitrile, sulfoxide, or amide solvent, or a mixture thereof.

Some examples of carbonate solvents suitable for use in an electrolyte include propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkylcarbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

Some examples of sulfone solvents suitable for use in an electrolyte include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone).

The polar aprotic solvent can be silicon-containing, e.g., a siloxane or silane. Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane.

Other types of polar aprotic solvents include ether, ester, nitrile, sulfoxide, and amide solvents. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The polar aprotic solvent may also be, for example, an organochloride (e.g., methylene chloride, chloroform, 1,1,-trichloroethane), ketone (e.g., acetone, 2-butanone), organoether (e.g., diethyl ether, tetrahydrofuran, and dioxane), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA).

In some embodiments, the polar aprotic solvent is partially or completely replaced with one or more ionic liquid compounds. The ionic liquid can be denoted by the formula $Y^+X^-$, wherein $Y^+$ is a cationic component of the ionic liquid and $X^-$ is an anionic component of the ionic liquid. The formula $(Y^+)(X^-)$ is meant to encompass a cationic component $(Y^+)$ having any valency of positive charge, and an anionic component $(X^-)$ having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a·y=b·x (wherein the period placed between variables indicates multiplication of the variables).

The ionic liquid compound is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

In various embodiments, the cationic portion $(Y^+)$ of the ionic liquid $Y^+X^-$ is selected from imidazolium, pyridinium, pyrazinium, pyrrolidinium, piperidinium, piperazinium, morpholinium, pyrrolium, pyrazolium, pyrimidinium, triazolium, oxazolium, thiazolium, and triazinium rings, as well as quaternary ammonium, phosphonium, sulfonium, and cyclic and acyclic guanidinium rings. The counteranion $(X^-)$ of the ionic liquid can be any of the counteranions well known in the art. In some embodiments, the counteranion is inorganic by not including any C—C, C—H, or C—F bonds, such as a halide (e.g., $F^-$, $Cl^-$, $Br^-$, or $I^-$), $PCl_6^-$, $PF_6^-$, perchlorate, chlorate, chlorite, cyanate, isocyanate, thiocyanate, isothiocyanate, perbromate, bromate, bromite, periodiate, iodate, dicyanamide (i.e., $N(CN)_2^-$), tricyanamide (i.e., $N(CN)_3^-$), nitrate, nitrite, carbonate, bicarbonate, sulfate, sulfite, hydrogensulfate, hydrogensulfite, phosphate, hydrogenphosphate ($HPO_4^{2-}$), and dihydrogenphosphate ($H_2PO_4^-$). In other embodiments, the counteranion is carbon-containing (i.e., organic) by containing at least one C—C, C—H, or C—F bond, such as the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of polar aprotic solvents and/or ionic liquids are excluded from the electrolyte. In other embodiments, a combination of two or more polar aprotic solvents and/or ionic liquids are included in the electrolyte.

The lithium-containing species (generally, a lithium salt) can be any of the lithium-containing species known in the art for use in lithium-ion batteries. Any of the counteranions $X^-$, described above, can be included as a counteranion in the lithium salt. In one embodiment, the lithium-containing species is non-carbon-containing (i.e., inorganic). For example, the lithium-containing species can be a lithium ion salt of such counteranions as the halides (e.g., $F^-$, $Cl^-$, $Br^-$, or $I^-$), hexachlorophosphate ($PCl_6^-$), hexafluorophosphate ($PF_6^-$), perchlorate, chlorate, chlorite, perbromate, bromate, bromite, periodiate, iodate, aluminum fluorides (e.g., $AlF_4^-$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometallates.

In another embodiment, the lithium-containing species is carbon-containing (i.e., organic). The organic counteranion may, in one embodiment, lack fluorine atoms. For example, the lithium-containing species can be a lithium ion salt of such counteranions as carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), anionic carborane clusters, the alkylsulfates (e.g., diethylsulfate), alkylphosphates (e.g., ethylphosphate or diethylphosphate), dicyanamide (i.e., $N(CN)_2^-$), and the phosphinates (e.g., bis-(2,4,4-trimethylpentyl)phosphinate). The organic counteranion may, in another embodiment, include fluorine atoms. For example, the lithium-containing species can be a lithium ion salt of such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In some embodiments, any one or more classes or specific types of the above-described lithium-containing species are excluded from the electrolyte. In other embodiments, a combination of two or more lithium salts are included in the electrolyte. Other cationic species, such as sodium ions or an ammonium species, may or may not also be included.

The lithium-containing species is incorporated in the electrolyte medium in an amount that imparts a suitable concentration of lithium ions and suitable level of conductivity to the electrolyte medium. The conductivity of the electrolyte medium can be, for example, at least 0.01 mS/cm (0.001 S/m) at an operating temperature of interest, and particularly at a temperature within 20-60° C. In different embodiments, the lithium-containing species is present in the electrolyte in a concentration of precisely, about, at least, above, up to, or less than, for example, 0.1, 0.5, 1.0, 1.2, 1.5, 1.8, 2, 2.5, or 3 M, where "M" indicates a molarity concentration.

In yet another aspect, the invention is directed to a method of operating a lithium-ion battery, described above, that contains the graft copolymer composition of Formula (1) in an anode of the battery. The operation of lithium-ion batteries is well known in the art. The lithium-ion battery described herein can advantageously exhibit an initial delithiation capacity of at least or above, for example, 500, 550, 600, 650, 700, or 750 mAh/g, or an initial delithiation capacity within a range bounded by any two of the foregoing values. The lithium-ion battery described herein can alternatively or in addition exhibit a $100^{th}$ (i.e., at the $100^{th}$ cycle) delithiation capacity of at least or above, for example, 200, 250, 300, 350, 400, 450, 500, 550, or 600 mAh/g, or a $100^{th}$ delithiation capacity within a range bounded by any two of the foregoing values. In some embodiments, the lithium-ion battery maintains any of the foregoing delithiation capacities for 150, 200, 250, 300, 350, 400, 450, 500, 600, 700, 800, 900, or 1000 cycles. The lithium-ion battery described herein can alternatively or in addition exhibit an initial coulombic efficiency of at least or above, for example, 60%, 65%, 70%, 75%, 80%, 85%, 90%, or 95%, or an initial coulombic efficiency within a range bounded by any two of the foregoing values. The lithium-ion battery described herein can alternatively or in addition exhibit a $20^{th}$ (i.e., at the $20^{th}$ cycle) coulombic efficiency of at least or above, for example, 98.0%, 98.5%, 99.0%, or 99.5%. In some embodiments, the lithium-ion battery maintains any of the foregoing coulombic efficiencies for 30, 40, 50, 60, 70, 80, 90, or 100 cycles.

Examples have been set forth below for the purpose of illustration and to describe certain specific embodiments of the invention. However, the scope of this invention is not to be in any way limited by the examples set forth herein.

EXAMPLES

Synthesis of a Series of Graft Polymer Compositions Containing a Glycol Chitosan (GC) Backbone and Poly (Acrylic Acid) (PAA) Graft Polymer Side Chains The synthetic methodology used in the following experiments is in accordance with the following general scheme:

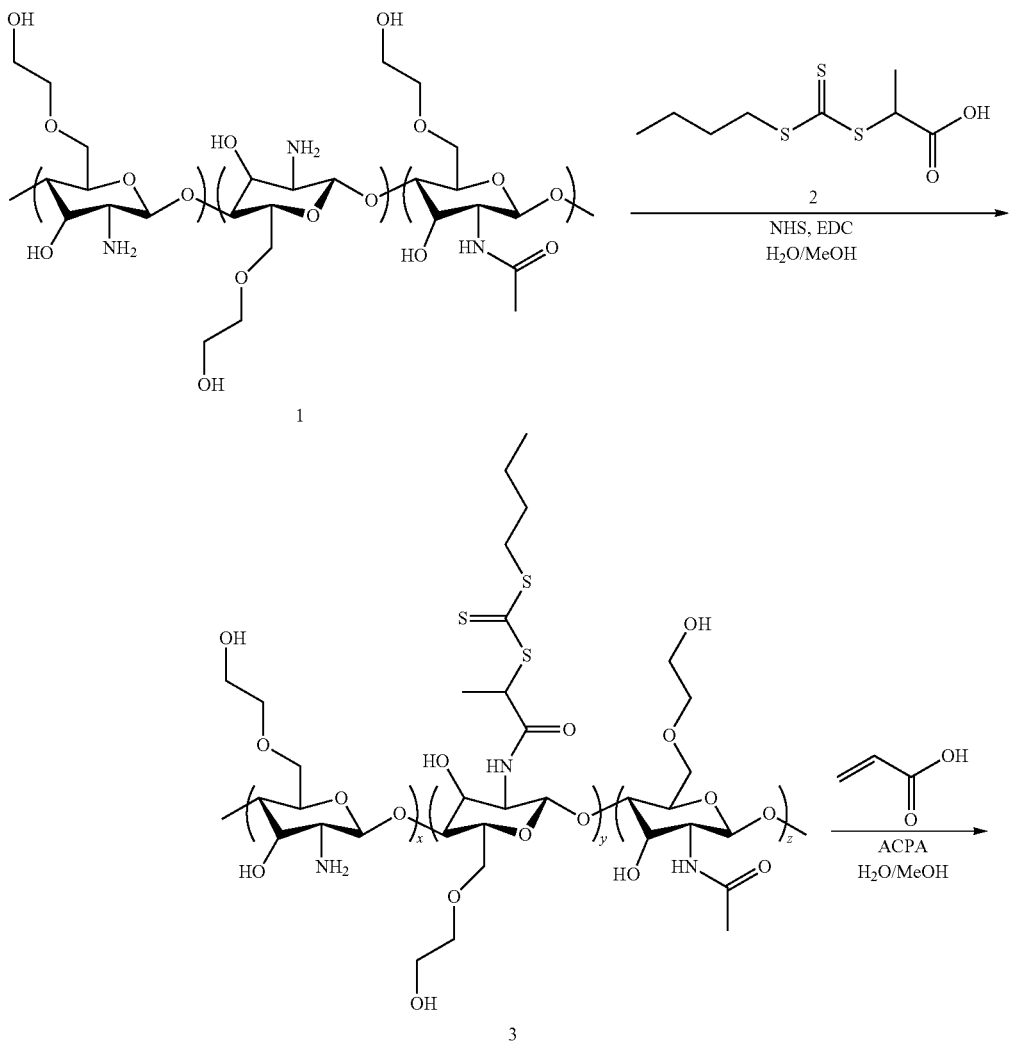

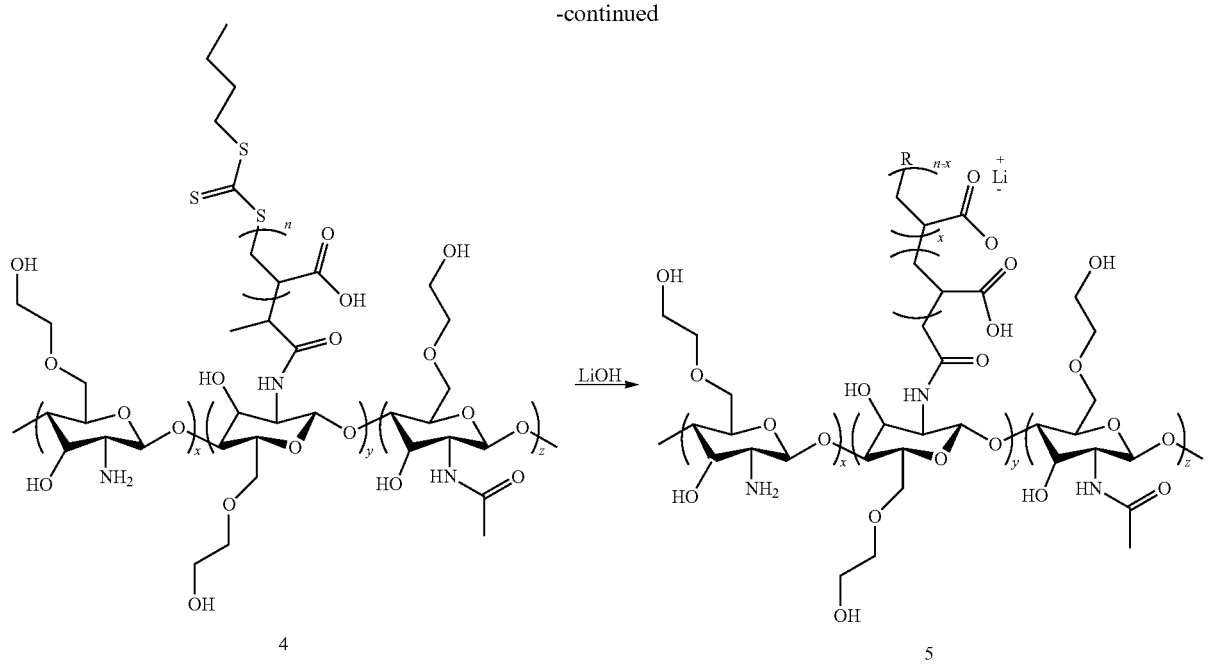

Synthesis of the Macro-RAFT-CTA (Compound 3).

A typical synthesis of $GC_{22\%}$-RAFT was performed as follows: 800 mg (3.60 mmol repeating units) of GC was dissolved in 120 mL of mixed solvent $V(H_2O)/V(CH_3OH)$= 2:1 by vigorously stirring overnight at 45° C. EDC (0.552 g, 2.88 mmol) and NHS (0.332 g, 2.88 mmol) were added to the solution by the addition of 0.514 g (2.16 mmol) of carboxylic acid terminated RAFT-CTA (compound 2) in 10 mL of mixed solvent $V(H_2O)/V(CH_3OH)$=1:1. The mixture was stirred at 35° C. for two days before it was purified by dialysis using a semi-permeable membrane (Mw=3.5 kDa) against the mixed solvent $V(H_2O)/V(CH_3OH)$=3:1. The structure of the product was confirmed by $^1$H NMR and IR spectra.

Synthesis of the Graft Block Copolymer GC-g-LiPAA (Compound 5 in the above scheme). A typical synthesis of $GC_{22\%}$-g-LiPAA$_{62}$ was performed as follows: 452 mg of $GC_{22\%}$-RAFT (0.367 mmol RAFT-CTA) was dissolved in 60 mL of mixed solvent $V(H_2O)/V(CH_3OH)$=3:1. To that solution, 3.97 g of acrylic acid (55.1 mmol) and 10.3 mg of ACPA (3.67×10$^{-4}$ mol) in 40 mL of DI water were added. The RAFT polymerization was performed at 70° C. for 10 hours. Further dialysis using the semi-permeable membrane (Mw=14 kDa) against water afforded the purified $GC_{22\%}$-g-LiPAA$_{62}$. The $GC_{22\%}$-g-LiPAA$_{62}$ product was obtained by dropping the aqueous solution of LiOH into that of $GC_{22\%}$-g-LiPAA$_{62}$ until a pH of 7 was reached. The structure of the product was confirmed by $^1$H NMR and IR spectra.

Preparation of Electrodes and Assembly of Coin Cells.

All of the coin cells (stainless steel CR-2032) were prepared and assembled in an argon-filled glovebox. The synthetic polymers (10% in weight) were dissolved in DI water (1-methyl-2-pyrrolidine (NMP) for PVDF), followed by the addition of SiNPs (15% in weight, 70-120 nm), graphite (73% in weight), and carbon black (2% in weight). The composite was mixed using a homogenizer for two hours, and the slurry was coated on a copper foil by using a doctor blade (8 mil). The coated electrode was placed in the vacuum oven for 18 hours at 120° C. before it was transferred into the glovebox for coin cell assembly. The coin cells consisted of polypropylene (Celgard® 2400) as separator, 1.2 M lithium hexafluorophosphate (LiPF$_6$) in ethylene carbonate (EC), ethyl methyl carbonate (EMC) (EC/EMC=3:7 wt) with 10 wt % of fluoroethylene carbonate (FEC) as electrolyte, and Li metal as counter electrode. Galvanostatic cycling between 50 mV and 1.5 V was conducted using Series 4000 MACCOR batteries cycler. The cycling was conducted at 25° C. by keeping the cells in a temperature control chamber while testing. Cyclic voltammetry (CV) between 50 mV and 3 V vs Li/Li$^+$ was executed by using a VSP300 potentiostat (Biologic, Claix, France) with a fixed voltage rate (10 mV/s) at room temperature. Three coin cells were made from each of the composite anodes, and the average specific capacity was recorded. Error analysis is included in data presented later on herein, such as in Table 1. All of the specific capacities reported in this study are per gram of active materials (SiNPs+graphite). The C rate was also determined based on the theoretical capacity of active materials (SiNPs+graphite).

Synthesis of Graft Copolymer.

Systematic investigation on the architecture effect of synthetic polymer on binder performance requires the synthesis of graft copolymers with well-controlled structure parameters, such as side chain length and grafting density. A "graft from" strategy was selected here instead of "graft to" because it can overcome the steric hindrance and provide a controlled grafting density and side chain length (e.g., Zoppe, J. O. et al., Chem. Rev. 2017, 117, 1105-1318). A hydrophilic derivative of chitosan, glycol chitosan (GC), was selected as the polymer backbone due to its high-modulus nature, good water solubility, and abundant reactive groups for facile modification. The macro-RAFTCTA (above scheme, compound 3) was synthesized via the amidation reaction between the GC and carboxylic acid terminated RAFT-CTA (compound 2) in aqueous solution. The comparative integration of relevant peaks in the 1H NMR spectra of GC and $GC_{22\%}$-RAFT was used to calculate the average grafting density of the RAFT-CTA on the GC backbone: 22.1% of the repeating units have been functionalized, which corresponds to 88 arms per graft copolymer.

RAFT polymerization of acrylic acid from the macro $GC_{22\%}$-RAFT (3) allows the growth of polymer side chains. The significant absorption peak lying at 1692 cm$^{-1}$ attributed to the typical stretching mode of the C=O bond in the carboxylic acid suggests the successful grafting of PAA side chains. Moreover, comparative integration of the peak from terminal methyl groups in the RAFT-CTA compared with that from the repeating units in the PAA provides the degree of polymerization (DP$_n$) of the PAA being 62. Neutralization of the obtained $GC_{22\%}$-g-PAA$_{62}$ by addition of LiOH produces the $GC_{22\%}$-g-LiPAA$_{62}$ product, which was confirmed by the significant growth of the carboxylate peak at 1544 cm$^{-1}$ at the expense of the carboxylic acid peak.

Comparative Binder Performance with Linear Analogue

The composite electrode with 73% graphite and 15% silicon as the active materials at a relatively higher mass loading (loading of active materials>2.5 mg/cm$^2$; thickness>30 μm) than the typical silicon-based electrode (<0.5 mg/cm$^2$) was fabricated. The theoretical specific capacity was calculated to be 875 mAh/g. Moreover, the good water solubility of the obtained graft copolymer $GC_{22\%}$-g-LiPAA$_{62}$ allows use of water as the solvent, which possesses significant advantages over the traditional organic solvent, that is, 1-methyl-2-pyrrolidine (NMP), such as low cost and minimized environmental effect. Energy-dispersive X-ray spectroscopy (EDX) mapping was also applied to scan the obtained composite film. In addition to forming a porous architecture, the homogeneous distribution of silicon suggests the even distribution of the active materials in the composite anode film. The high viscosity of the polymer binder solution (FIG. 1A) can prevent sedimentation and aggregation of the active materials during the electrode fabrication process and contribute to the formation of uniform film on the current collector.

The architecture effect of synthetic polymer binders on the electrochemical performance of the silicon/graphite electrode was first investigated by comparing the synthesized graft copolymer with the linear analogues. Pure GC and a physical mixture of GC and LiPAA ($GC_{21\%}$-m-LiPAA$_{76}$, 11.8 wt % of GC and 88.2 wt % of LiPAA, same as that of $GC_{22\%}$-g-LiPAA$_{62}$) were utilized as the linear analogues for comparison purpose. The linear LiPAA with the comparable DP$_n$ (76 vs 62) was also synthesized by RAFT polymerization of the acrylic acid and subsequent neutralization by LiOH (see the above scheme for chemical structure).

Figure 2A:
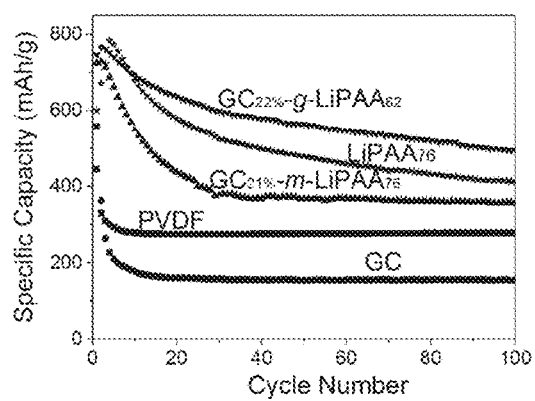
FIGS. 2A-2D. These figures show the cycling performance of silicon/graphite electrodes from the polymer binder of PVDF, GC, LiPAA$_{76}$, GC$_{21\%}$-m-LiPAA$_{76}$, and GC$_{22\%}$-g-LiPAA$_{62}$.
Figure 2B:
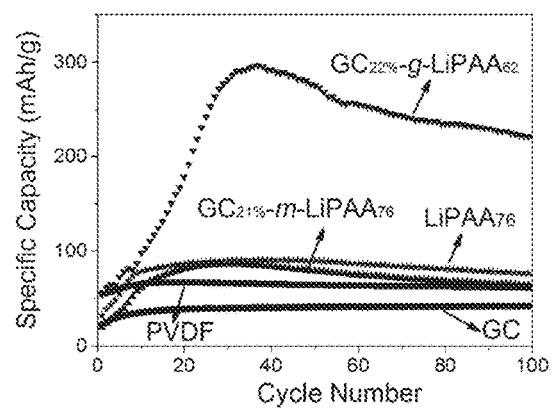
Figure 2C:
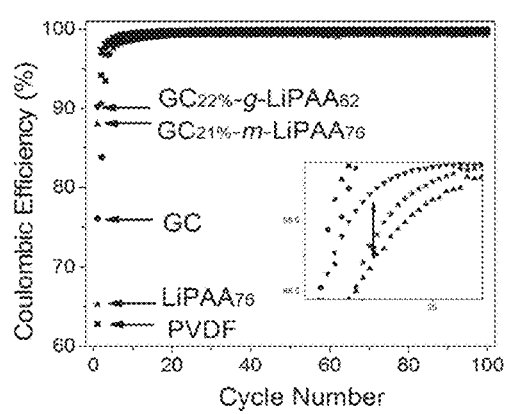
Figure 2D:
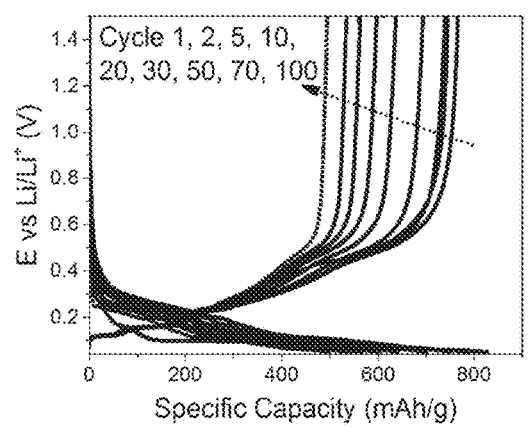

FIGS. 2A-2D show the cycling performance of silicon/graphite electrodes from the polymer binder of PVDF, GC, LiPAA$_{76}$, $GC_{21\%}$-m-LiPAA$_{76}$, and $GC_{22\%}$-g-LiPAA$_{62}$. FIG. 2A shows the cycling performance at a current rate of C/10, while FIG. 2B shows the cycling performance at a current rate of C/1. FIG. 2C shows the coulombic efficiency of the electrodes from different polymer binders; the inset is the zoom-in area showing the comparative efficiency of electrodes from $GC_{21\%}$-m-LiPAA$_{76}$ and $GC_{22\%}$-g-LiPAA$_{62}$ in the first 30 cycles. FIG. 2D shows the voltage profiles of the electrodes with $GC_{22\%}$-g-LiPAA$_{62}$ binders. As illustrated in FIG. 2A, the electrodes based on PVDF and GC showed acceptable delithiation capacities, that is, 445 mAh/g and 558 mAh/g, in the first cycle. However, a rapid capacity loss was observed for the subsequent cycles, and less than 300 mAh/g capacity was retained, which was mostly contributed by the graphite. The poor cyclability of the electrodes with PVDF and GC binders indicates the isolation of silicon nanoparticles from the conduction network (called "dead" silicon) after the initial cycles.

Addition of neutralized linear LiPAA to the GC can promote physical interaction with the silicon materials and provide extra lithium ion access to mitigate the deactivation of silicon particles. The electrodes with the physical mixture of LiPAA and GC ($GC_{21\%}$-m-LiPAA$_{76}$) as the binder showed higher initial delithiation capacity, 725 mA/g, and better cycling performance (356 mAh/g after 100 cycles) than GC and PVDF. The electrodes with graft copolymer $GC_{22\%}$-g-LiPAA$_{62}$ showed comparable initial delithiation capacity (745 mAh/g) but significantly improved cycling performance with a delithiation capacity of 495 mAh/g after 100 cycles. Moreover, as illustrated in FIG. 2C, the graft copolymer $GC_{22\%}$-g-LiPAA$_{62}$ exhibited higher initial Coulombic efficiency than its linear analogues (90.3% vs 62.8%, 76.1%, and 88.1%). The electrode with $GC_{22\%}$-g-LiPAA$_{62}$ as the binder also showed higher Coulombic efficiency for the following 30 cycles than that of $GC_{22\%}$-m-LiPAA$_{76}$ (inset of FIG. 2C).

As shown by the data in FIG. 2B, the cycling performance of electrodes with high charging rate (C/1) suggested even more significant advantages of binder $GC_{22\%}$-g-LiPAA$_{62}$ compared with $GC_{22\%}$-m-LiPAA$_{76}$ (221 mAh/g compared with 64 mAh/g after 100 cycles, FIG. 2B). The comparatively improved cycling performance of the graft copolymer compared with linear analogue is consistent with previous publications (e.g., Wei, L., et al., *Sci. Rep.* 2016, 6, 19583). Surprisingly, a significantly improved cycling performance of $GC_{22\%}$-g-LiPAA$_{62}$ was observed compared with that of $GC_{21\%}$-m-LiPAA$_{76}$ in retaining both capacity and Coulombic efficiency. With the same chemical composition and functional group ratio, the significantly improved cycling performance clearly suggests the advantage of a multi-grafted architecture over the physical mixture, which may be contributed by the formation of a better interfacial architecture.

The improved binder performance of graft copolymer $GC_{22\%}$-g-LiPAA$_{62}$ can be explained as follows. First, the incorporation of numerous LiPAA side chains in the graft copolymer allows for more efficient interaction with the SiNPs, which can efficiently prevent the isolation of SiNPs from the surrounding conductive network. The enhanced interaction is supported by the higher adhesion force of $GC_{22\%}$-g-LiPAA$_{62}$ with silicon tip compared to that of GC. Compared with the GC-m-LiPAA, the covalent connection of LiPAA on GC may contribute to the formation of a three-dimensional network around the SiNPs. The significantly higher peeling force of the electrode made from $GC_{22\%}$-g-LiPAA$_{62}$ (~0.75 N/cm) compared with that from $GC_{22\%}$-m-LiPAA$_{76}$ (<0.1 N/cm) confirms improved adhesion strength of the composite electrode using $GC_{22\%}$-g-LiPAA$_{62}$ with the current collector. Second, the enhanced interaction and extra lithium-ion source should help to form a stable solid electrolyte interphase (SEI) layer on SiNPs. The small irreversible peak at about 1.25 V in the first cathodic scan, which disappeared in the subsequent scans, can be associated with the formation of SEI film.

The sharp peak below 0.3 V during the first lithiation scan corresponds to lithiation in graphite and the phase transition of Si (from crystalline Si to amorphous lithium silicide). The two oxidation peaks, 0.32 and 0.51 V, during the delithiation scans are ascribed to the delithiation of Li$_x$C and Li$_x$Si, which transform to graphite and amorphous silicon. The significantly higher Coulombic efficiency of the electrode from the $GC_{22\%}$-g-LiPAA$_{62}$ also suggests the formation of a stable SEI layer on SiNPs. The comparatively lower level of polymer/electrolyte interactions of $GC_{22\%}$-g-$LiPAA_{62}$ compared with PVDF should be another reason for its improved binder performance at the current rate of C/10. Atomic force microscopy indentation studies indicate that the stiffness of the film made from $GC_{22\%}$-g-$LiPAA_{62}$ did not change significantly after immersion into the electrolyte solvent (2.46 GPa vs 3.99 GPa), whereas the film from PVDF became more than 8 times softer (0.09 GPa vs 0.74 GPa). This significantly lower polymer/electrolyte interaction may prevent the undesirable access of electrolyte liquid to the binder/Si interface and cause deformation of the electrode. Lastly, the comparative higher solution viscosity of the graft copolymer may also contribute to the formation of a homogeneous electrode film due to the reason pointed out above.

Effect of Architecture Parameters on Binder Performance

The architecture parameters, such as the side chain length and grafting density, significantly impact the property of the graft copolymer. Herein, the architecture effect on binder performance was investigated using the graft polymer $GC_{22\%}$-g-$LiPAA_{62}$ with variable side chain length and grafting density.

Figure 3:
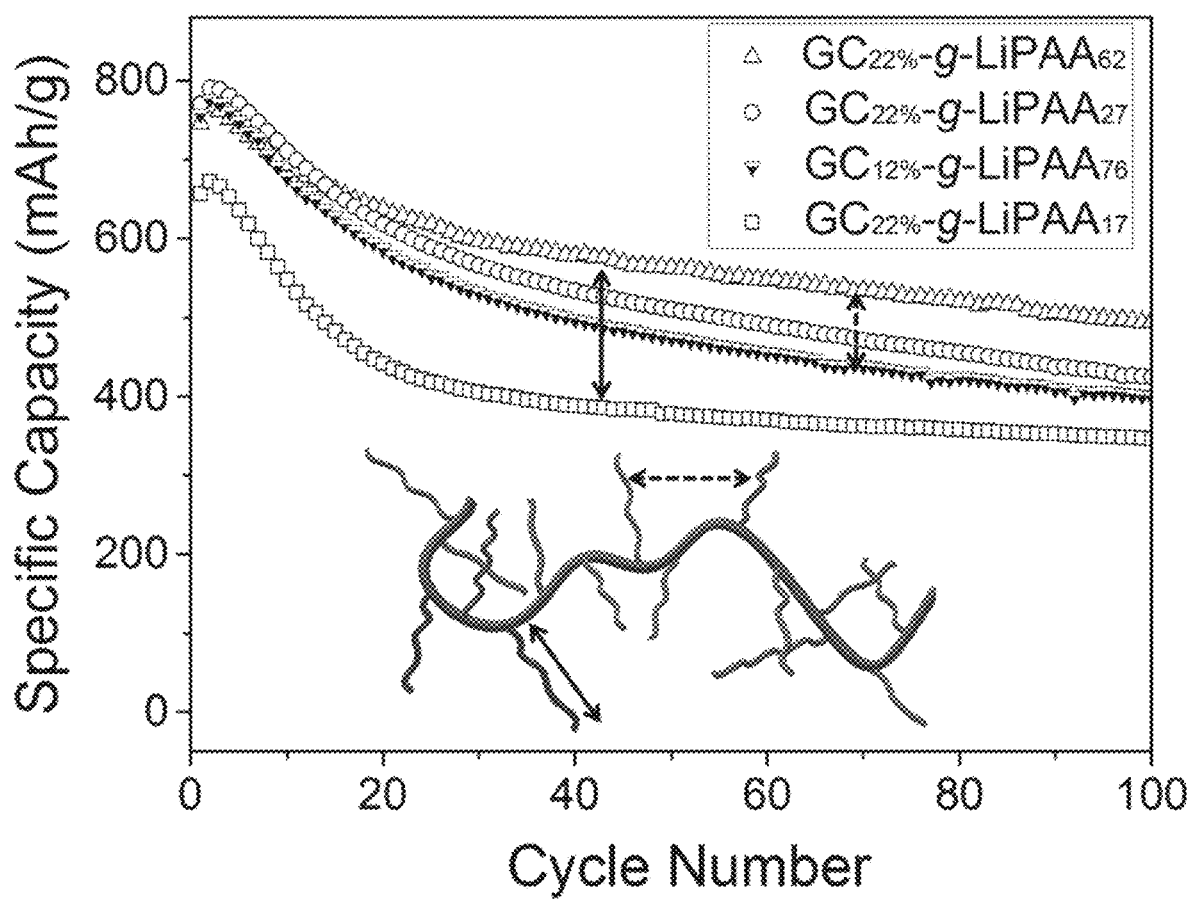
FIG. 3. Graph plotting cycling performance of silicon/graphite electrodes from the polymer binder of GC$_{22\%}$-g-LiPAA$_{17}$, GC$_{22\%}$-g-LiPAA$_{27}$, GC$_{22\%}$-g-LiPAA$_{62}$, and GC$_{12\%}$-g-LiPAA$_{76}$ at a current rate of C/10 (i.e., 1C).

The side chain length of the grafted copolymer was adjusted by changing the feeding ratio of monomer (acrylic acid) to macro-RAFT-CTA ($GC_{22\%}$-RAFT, 4). After neutralization by LiOH, the $GC_{22\%}$-g-$LiPAA_x$ with different $DP_n$ were obtained. The galvanostatic results of the graft copolymer $GC_{22\%}$-g-$LiPAA_x$ with fixed grafting density and different side chain lengths, that is, $DP_n=17$, 27, and 62, are shown in FIG. 3. Significant improvement was observed when the side chain length of $GC_{22\%}$-g-$LiPAA_x$ increased from $DP_n=17$ to $DP_n=27$ in terms of both first-cycle delithiation capacity (771 mAh/g vs 656 mAh/g) and long cycling performance (425 mAh/g vs 347 mAh/g at 100th cycle). Comparable initial discharge capacity was obtained when further increasing the side chain length from $DP_n=27$ to $DP_n=62$ (746 mAh/g for $DP_n=62$ vs 771 mAh/g for $DP_n=27$). In terms of long-term cycling performance, the electrode made of $GC_{22\%}$-g-$LiPAA_{62}$ showed better performance (495 mAh/g at 100th cycle) than that with the $GC_{22\%}$-g-$LiPAA_{27}$ (425 mAh/g at 100th cycle), while this difference is much less significant comparing with that when the $DP_n$ of side chain increased from 17 to 27 (FIG. 3).

Figure 1B:
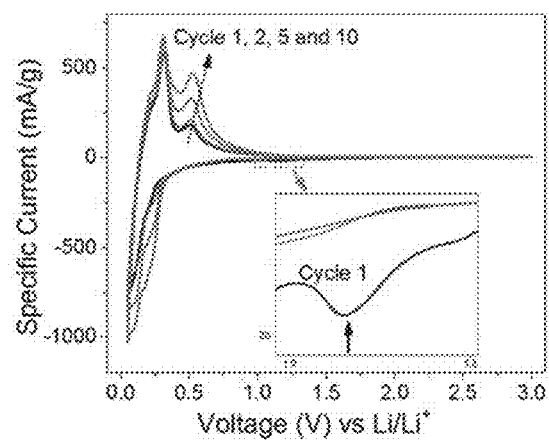
Figure 1C:
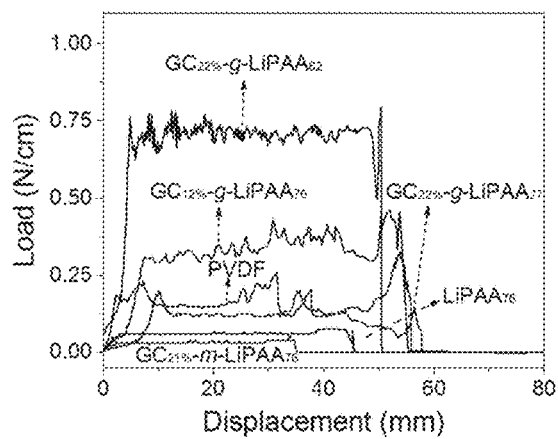
Figure 1D:
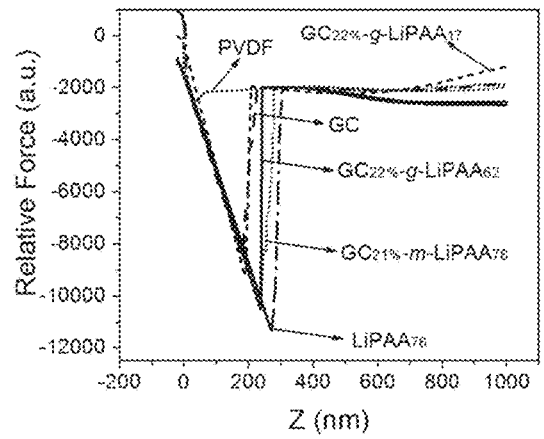

FIG. 1A is a plot of solution viscosity of different polymer binders at the same polymer concentration (1 mg/mL), shear rate (10 s$^{-1}$), and temperature (20° C.): (I) $GC_{22\%}$-g-$LiPAA_{16}$, (II) $GC_{22\%}$-g-$LiPAA_{27}$, (III) $GC_{22\%}$-g-$LiPAA_{62}$, (IV) $GC_{12}\%$-g-$LiPAA_{76}$, (V) $GC_{21\%}$-m-$LiPAA_{76}$, and (VI) GC. FIG. 1B shows cyclovoltammetric (CV) curves of a Si/graphite electrode with $GC_{22\%}$-g-$LiPAA_{62}$ as polymer binder; inset is the zoom-in image to show the small peak in the first cathodic scan. FIG. 1C shows a peer test result of anode films with different polymer binders. FIG. 1D shows the related adhesion force of different polymer binders measured by AFM; the curve with lower relative force value (more negative) corresponds to higher adhesion force.

The significantly improved long-term cycling performance of the electrode made from the graft copolymer with increased side chain length may be explained as follows. The graft block copolymers with longer side chains possess higher degree of intermolecular entanglement or interaction, and hence, also more interactions with active materials and current collector. The significantly higher adhesion force of $GC_{22\%}$-g-$LiPAA_{62}$ with the silicon tip (FIG. 1D) and higher peeling strength of the electrode made from the $GC_{22\%}$-g-$LiPAA_{62}$ (FIG. 1C) compared with those from $GC_{22\%}$-g-$LiPAA_{17}$ evidence an interaction enhancement by use of the longer side chains. Moreover, the higher solution viscosity of graft copolymer with longer side chains (26.3 mPa·s to 56.0 mPa·s and 195 mPa·s when $DP_n$ of side chain increased from 17 to 27 and 62, as shown in FIG. 1A) may provide additional evidence for their higher degree of intermolecular entanglement or interaction, and hence, also more interactions with the electrode composite. This interaction enhancement will reduce the possibility of SiNPs being disconnected from the conductive network during the cycling process.

To further investigate the effect of grafting density on the cycling performance, a graft copolymer with lower grafting density and comparable side chain length was also synthesized. The $^1$H NMR spectra analysis of the obtained graft block copolymer suggests the grafting ratio and side chain length are 12% and $DP_n=76$, respectively. The galvanostatic result showed that the electrode with $GC_{12}\%$-g-$LiPAA_{76}$ exhibited comparable initial delithiation capacity with that from $GC_{22\%}$-g-$LiPAA_{62}$ (758 mAh/g vs 745 mAh/g). However, after 10 cycles, the graft copolymers with higher grafting density exhibited an advantage in the long term cycling performance (67% retaining capacity for $GC_{22\%}$-g-$LiPAA_{62}$ vs 54% retaining capacity for $GC_{12}\%$-g-$LiPAA_{62}$ at 100th cycle). The better cycling performance of the graft copolymer with higher grafting density should be mainly attributed to the increased number of anchoring points (88 arms vs 48 arms) that interact with the active material and conduction network. Similar to the explanation above, the higher peeling strength (FIG. 1C) and increased solution viscosity (23.1 mPa·S to 195 mPa·S) suggest that the enhanced interaction of the high grafting-density graft copolymer with electrode composite is responsible for the improved binder performance.

The following table provides a summary of the performance of the coin cell batteries with different polymer binders at the anode:

TABLE 1

Properties and performance values of lithium-ion test batteries having different polymer binders at the anode

| Polymer binder at anode[a] | Porosity (%) | Initial delithiation capacity (mAh/g) | 100$^{th}$ delithiation capacity (mAh/g) | Initial Coulombic efficiency (%) | 20$^{th}$ Coulombic efficiency (%) |
|---|---|---|---|---|---|
| PVDF | 63.8 ± 0.5 | 445 ± 2.7 | 278 ± 1.6 | 63.8 ± 0.9 | 99.7 ± 0.1 |
| GC | 62.7 ± 0.9 | 558 ± 18 | 155 ± 5.6 | 76.1 ± 0.1 | 99.7 ± 0.0 |
| $GC_{21\%}$-m-$LiPAA_{76}$ | 59.2 ± 6.3 | 729 ± 13 | 356 ± 3.6 | 88.1 ± 0.3 | 99.1 ± 0.1 |
| $LiPAA_{76}$ | 56.1 ± 7.0 | 723 ± 17 | 411 ± 8.9 | 65.3 ± 0.4 | 99.3 ± 0.1 |
| $GC_{22\%}$-g-$LiPAA_{62}$ | 73.2 ± 1.5 | 745 ± 12 | 495 ± 2.9 | 90.3 ± 0.1 | 99.4 ± 0.0 |

TABLE 1-continued

Properties and performance values of lithium-ion test batteries having different polymer binders at the anode

| Polymer binder at anode[a] | Porosity (%) | Initial delithiation capacity (mAh/g) | 100th delithiation capacity (mAh/g) | Initial Coulombic efficiency (%) | 20th Coulombic efficiency (%) |
|---|---|---|---|---|---|
| $GC_{22\%}$-g-$LiPAA_{27}$ | 64.5 ± 0.9 | 771 ± 10 | 425 ± 3.2 | 92.9 ± 0.0 | 99.2 ± 0.1 |
| $GC_{22\%}$-g-$LiPAA_{17}$ | 47.7 ± 1.2 | 671 ± 21 | 346 ± 4.7 | 92.8 ± 0.2 | 99.2 ± 0.0 |
| $GC_{12\%}$-g-$LiPAA_{76}$ | 68.7 ± 0.7 | 758 ± 6.4 | 400 ± 1.2 | 91.1 ± 0.1 | 99.1 ± 0.0 |

[a]Subscript following GC indicates the molar ratio of LiPAA to the monomer of GC; m means physical mixing; g means chemical grafting; subscript following LiPAA is the $DP_n$ of LiPAA.

In summary, using a well-defined multi-grafting block copolymer as the binder for a silicon/graphite electrode, these experiments demonstrated the significant impact of polymer architectures on their properties and ultimate battery performance. The graft copolymer GC-g-LiPAA with GC as backbone and LiPAA as side chains was obtained by amidation reaction and RAFT polymerization. The side chain length and degree of grafting density are tunable by changing the feed ratio during the reaction. Using an environmentally friendly and economical solvent (e.g., water), a high mass-loading silicon/graphite composite electrode (active materials>2.5 mg/cm²), based on graft copolymer (GC-g-LiPAA), was fabricated and tested by galvanostatic measurement. Compared with the linear analogues, such as GC and physical mixture of GC and LiPAA, the silicon/graphite composite electrode made with the graft copolymer GC-g-LiPAA exhibits a significantly improved initial discharge capacity, long-term retaining capacity, and Coulombic efficiency. With the same chemical composition and functional group ratio, the improved cycling performance of graft block copolymer GC-g-LiPAA in both retaining capacity and Coulombic efficiency demonstrated the importance of polymer binder architecture. Significant improvement in binder performance was observed when the $DP_n$ of side chains in GC-g-LiPAA increased from 17 to 27, and slight improvement was observed when the $DP_n$ increased from 27 to 62.

Moreover, significant advantage in the long term cycling performance was also observed when grafting density of the polymer binders increased from 11% to 22%. The preferred longer side-chain length and higher grafting density as the polymer binder for silicon/graphite composite electrode is due to the enhanced interaction with the anode composite, as evidenced by the higher peeling strength and increased solution viscosity. The results presented herein demonstrate the use of polymer-binder morphology and architecture as key variables for mitigating capacity loss and degradation in high capacity electrode materials that undergo severe volume expansion under electrochemical cycling.

While there have been shown and described what are at present considered the preferred embodiments of the invention, those skilled in the art may make various changes and modifications which remain within the scope of the invention defined by the appended claims.

What is claimed is:

1. A graft copolymer composition comprising the following structure:

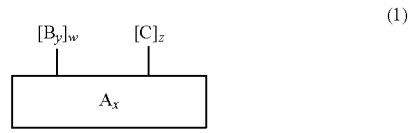

(1)

wherein:
- $A_x$ represents a polymer backbone having a number of polymerized monomer units x, wherein x is at least 20;
- $[B_y]$ represents a multiplicity of a graft polymer side chain having a number of polymerized monomer units y, wherein y is an integer of at least 10, and at least a portion of the monomer units in $B_y$ contains a group —C(O)OM, wherein M is independently selected in each occurrence from H and alkali metals;
- [C] represents a multiplicity of functional groups on the polymer backbone $A_x$ selected from the group consisting of hydroxy, carboxylic acid, carboxylate, carboxylic acid ester, amino groups, and precursors of any of the foregoing functional groups, and wherein the graft polymer side chain B or any other graft polymer side chain is not attached to said functional groups;
- the subscript w represents a grafting density of the group $B_y$, wherein w is an integer within a range of 10-50%; and
- the subscript z represents a density of the group C, wherein z=(100−w) %.

2. The graft copolymer composition of claim 1, wherein w is an integer within a range of 10-30%.

3. The graft copolymer composition of claim 1, wherein y is an integer within a range of 10-500.

4. The graft copolymer composition of claim 1, wherein w is an integer within a range of 10-30%, and y is an integer within a range of 10-500.

5. The graft copolymer composition of claim 1, wherein at least 10% of M is alkali metal.

6. The graft copolymer composition of claim 1, wherein $A_x$ represents chitosan.

7. The graft copolymer composition of claim 6, wherein w is an integer within a range of 10-30%.

8. The graft copolymer composition of claim 6, wherein y is an integer within a range of 10-500.

9. The graft copolymer composition of claim 6, wherein w is an integer within a range of 10-30%, and y is an integer within a range of 10-100.

10. A lithium-ion battery comprising:
(a) an anode comprising silicon nanoparticles and a graft copolymer composition comprising the following structure:

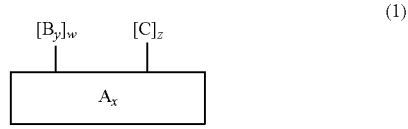
(1)

wherein:
$A_x$ represents a polymer backbone having a number of polymerized monomer units x, wherein x is at least 20;
$[B_y]$ represents a multiplicity of a graft polymer side chain having a number of polymerized monomer units y, wherein y is an integer of at least 10, and at least a portion of the monomer units in $B_y$ contains a group —C(O)OM, wherein M is independently selected in each occurrence from H and alkali metals;
[C] represents a multiplicity of functional groups on the polymer backbone $A_x$ selected from the group consisting of hydroxy, carboxylic acid, carboxylate, carboxylic acid ester, amino groups, and precursors of any of the foregoing functional groups, and wherein the graft polymer side chain B or any other graft polymer side chain is not attached to said functional groups;
the subscript w represents a grafting density of the group $B_y$, wherein w is an integer within a range of 10-50%; and
the subscript z represents a density of the group C, wherein z=(100−w) %;
(b) a cathode; and
(c) a lithium-containing electrolyte medium in contact with said anode and cathode.

11. The lithium-ion battery of claim 10, wherein said anode further comprises graphite.

12. The lithium-ion battery of claim 10, wherein said cathode is selected from lithium metal and lithium-intercalated materials.

13. The lithium-ion battery of claim 10, wherein w is an integer within a range of 10-30%.

14. The lithium-ion battery of claim 10, wherein y is an integer within a range of 10-500.

15. The lithium-ion battery of claim 10, wherein w is an integer within a range of 10-30%, and y is an integer within a range of 10-100.

16. The lithium-ion battery of claim 10, wherein at least 10% of M is alkali metal.

17. The lithium-ion battery of claim 10, wherein $A_x$ represents chitosan.

18. The lithium-ion battery of claim 17, wherein w is an integer within a range of 10-30%.

19. The lithium-ion battery of claim 17, wherein y is an integer within a range of 10-500.

20. The lithium-ion battery of claim 17, wherein w is an integer within a range of 10-30%, and y is an integer within a range of 10-500.

* * * * *